United States Patent [19]

Yamamoto et al.

[11] 4,134,530
[45] Jan. 16, 1979

[54] METHOD FOR CONSTRUCTION OF WATER INTAKE PORTION OF HYDRAULIC MACHINE

[75] Inventors: Kagehiko Yamamoto; Hideo Ito; Mizuho Tanaka; Shoji Sato; Hidetoshi Togashi, all of Hitachi; Isao Yanagida, Juomachi; Yukio Yamaguchi; Mutsuo Suzuki, Hitachi; Tadakazu Oguri, Hitachi; Hisanao Kita, Hitachi; Junzo Komatsu, Hitachi, all of Japan

[73] Assignee: Hitachi, Ltd., Japan

[21] Appl. No.: 657,272

[22] Filed: Feb. 11, 1976

[30] Foreign Application Priority Data

Feb. 14, 1975 [JP] Japan .................................. 50-17811

[51] Int. Cl.² ....................... F10D 25/24; B23K 31/02
[52] U.S. Cl. ............................... 228/182; 29/156.4 R; 415/219 C
[58] Field of Search ............... 228/178, 182, 183, 184, 228/104; 29/156.8 R, 156.8 CF, 156.4 R; 415/159, 160, 163, 219 C, 500, 161

[56] References Cited

U.S. PATENT DOCUMENTS

| | | | |
|---|---|---|---|
| 2,345,918 | 4/1944 | Dahlstand | 29/156.8 R |
| 2,807,871 | 10/1957 | Wagner et al. | 29/156.8 CF |
| 3,545,879 | 12/1970 | Piguet | 415/160 |
| 3,791,761 | 2/1974 | Hayes | 415/163 |
| 3,815,213 | 6/1974 | Evans et al. | 228/182 |
| 3,918,627 | 11/1975 | Kawano et al. | 228/178 |

FOREIGN PATENT DOCUMENTS

| | | | |
|---|---|---|---|
| 1066149 | 9/1959 | Fed. Rep. of Germany | 415/219 C |
| 1258360 | 1/1968 | Fed. Rep. of Germany | 415/219 C |
| 1144799 | 10/1957 | France | 415/219 C |
| 322758 | 8/1957 | Switzerland | 415/219 C |

Primary Examiner—Al Lawrence Smith
Assistant Examiner—K. J. Ramsey
Attorney, Agent, or Firm—Craig & Antonelli

[57] ABSTRACT

A water intake portion of a hydraulic machine consists of a casing and a speed ring positioned between the casing and guide vanes for guiding water from the casing to the guide vanes. The speed ring consists of a pair of upper and lower flat members of a ring form, a plurality of stay vanes positioned between the aforesaid pair of members for interconnecting same rigidly, and a reinforcing member of a cylindrical form, which is welded to the top surface of the upper flat member between the inner and outer circumferential edges of the upper flat member. Edges defining therebetween an opening of this casing are welded to the top surface of the upper flat member of a ring form, of the speed ring in the position between the aforesaid reinforcing member and the outer circumferential edge of the upper flat member, as well as to the undersurface of the lower flat member of a ring form, respectively. In this respect, the welding of the reinforcing member of a cylindrical form to the top surface of the upper flat member of a ring form is followed by the welding of the edges of the opening of the casing to the upper and lower flat members of a ring form.

2 Claims, 4 Drawing Figures

METHOD FOR CONSTRUCTION OF WATER INTAKE PORTION OF HYDRAULIC MACHINE

BACKGROUND OF THE INVENTION

1. Field of the Invention

This invention relates to a construction of a water intake or guide portion of a hydraulic machine, such as a water turbine, pump, pump water-turbine, and the like, and a method for fabricating same.

2. Description of the Prior Art

A water intake portion of a hydraulic machine, in general, consists of a casing and a speed ring continuous with the casing, while the speed ring consists of a pair of members positioned between the aforesaid casing and guide vanes, and stay vanes which interconnect the aforesaid pair of members, the stay vanes being confined between the aforesaid pair of members. A pair of the members used in a conventional speed ring are provided in the form of steel plates of a large gage or thickness, each of which has an inner circumferential edge formed with a reinforcing rib serving as a coupling flange, and an outer circumferential edge which runs along the curved contour of the casing and is welded thereto.

However, difficulties are confronted with non-destructive inspection of weld joints of curved portions of a steel plate having a large gage, and thus it appears impossible to conduct the non-destructive inspection of such joints in the setting-up site of a hydraulic machine, because of no equipment available and safety problems.

It has been a general practice that such a non-destructive inspection should be conducted in a plant, in which such inspection equipments are available. On the other hand, it is customary that the aforesaid pair of members are formed into a rectangular box-like shape in cross section, due to an increase in capacity of a hydraulic machine and due to a need to reduce the manufacture cost of the hydraulic machine. With such an arrangment, a modulus of section may be increased, so that plates of a small gage may be used.

The construction of the speed ring of a box type increases difficulties in welding operation, with the accompanying expenditure of much time and effort due to complexity of the construction.

Another attempt has been proposed for a speed ring, in which a pair of members each having I shaped cross section and made of steel plates of a small gage are used to take advantages of a large modulus of section. However, in such a construction three members, including one of edges defining an opening of a casing, have to be welded at one position.

This attempt is considered to aim at reduction in amount of members forming the casing by minimizing the diameter of the casing. However, the heat affected zones of such welds are necessarily subjected to lowering in strength, due to repeated applications of heat by at least three welding operations.

SUMMARY OF THE INVENTION

It is an object of the present invention to provide a construction of a water intake portion of a hydraulic machine, and a method for fabricating same, which provides welds between a casing and a speed ring in a simple construction and at a high reliability.

According to the present invention, there is provided a water intake portion of a hydraulic machine, which portion comprises: a speed ring consisting of a pair of upper and lower flat members of a ring form, stay vanes which interconnect said pair of members rigidly, and a reinforcing rib of a cylindrical shape, which is welded to the top surface of said upper flat member of a ring form; and a casing having an opening whose edges are welded, on one hand, to said upper flat member in a position between said rib and the outer circumferential edge of said upper flat member of a ring form, as well as to the undersurface of said lower flat member, on the other.

DESCRIPTION OF THE PREFERRED EMBODIMENTS

Figure 1:
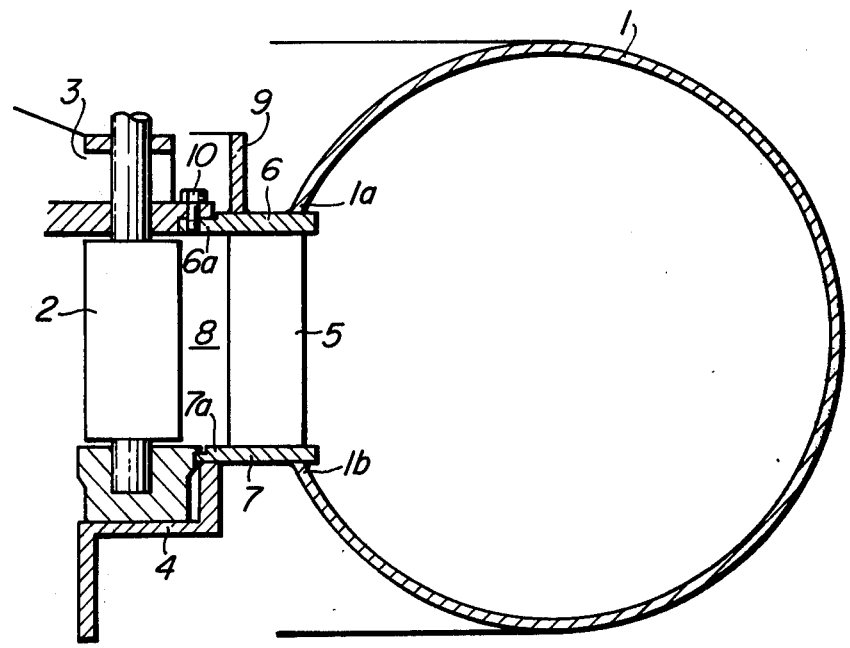
FIG. 1 is a partial cross-sectional view of a water intake portion embodying the present invention, showing a speed ring and part of a casing of a hydraulic machine.

To begin with the description of the first embodiment of the present invention, there are shown a portion of a speed ring, part of a casing and members associated therewith in FIG. 1. The speed ring, shown in cross section, is positioned between a spiral casing 1 and guide vanes 2. The speed ring consists of a pair of upper and lower flat members 6, 7 of a ring form, a plurality of stay vanes 5 which interconnect the aforesaid flat members 6, 7 by welding; and a reinforcing rib 9 of a cylindrical shape, which is welded to the top surface of the upper flat member of a ring form along its entire circumference. Edges 1a and 1b of the casing 1 defining therebetween an opening is welded, on one hand, to the top surface of the upper flat member 6 in the position between the rib 9 welded to the upper flat member 6, and the outer circumferential edge of the upper flat member 6 of a ring form, as well as to the undersurface of the lower flat member 7, on the other.

The water intake portion of a hydraulic machine consists of the speed ring and casing. The speed ring is attached to the guide vane portion of a water turbine. More specifically, one edge of an upper cover 3 in the guide vane portion is engaged in water-tight relation with an inner circumferential edge 6a of the upper flat member 6 and the engaging portion of the cover 3 with the flat member 6 is fastened together by means of bolts 10. Likewise, one edge of a lower cover 4 in the guide vane portion is engaged in water-tight relation with an inner circumferential edge 7a of the lower flat member 7.

The procedure for fabricating the water intake portion will be described in detail with reference to FIGS. 2 and 3.

To begin with, the speed ring and casing are fabricated separately. In other words, a plurality of stay vanes 5 are welded to the upper and lower flat members 6, 7 of a ring form respectively, being positioned therebetween, while the reinforcing rib 9 of a cylindrical shape is welded to the top surface of the upper flat member 6 of a ring form, thereby providing a speed ring. The welds in the speed ring are subjected to a non-destructive inspection. The casing 1 is of a circular cross section as shown in FIG. 1, and of a spiral form in a plan view. (The casing sometimes is divided into a plurality of segments.) When viewed in a plan view, the upper and lower flat members 6, 7 are joined to the inner circumferential edges 1a, 1b of the casing 1. Water is directed from the casing 1 through its opening into flow paths 8 defined by the upper and lower flat members 6, 7 and a plurality of stay vanes 5.

Figure 2:
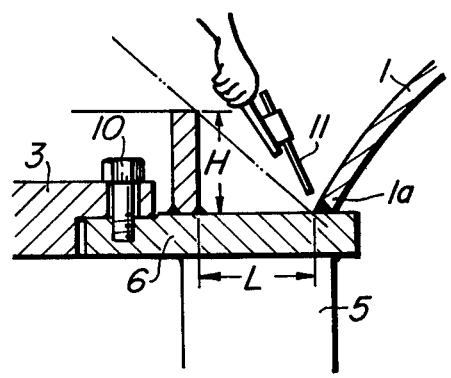
FIGS. 2 and 3 are partial cross-sectional views showing examples of a fabricating procedure of the water intake portion according to the present invention.
Figure 3:
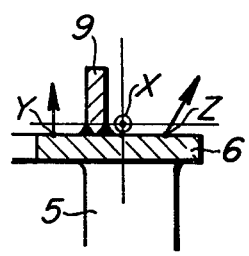

In the practical application, the speed ring and casing thus constructed are delivered to the setting-up site of a hydraulic machine, and then the edges 1a, 1b of the opening of casing 1 are welded to the surfaces of the upper and lower flat members 6, 7 by using a welding means 11 to form a water intake portion, as shown in FIG. 2. The non-destructive inspection is conducted for welds in the upper and lower flat members and casing 1 at this time.

Upon welding of the casing 1 to the speed ring, particularly upon welding of the edges of the opening in casing 1 to the upper flat member 6, there should be taken into consideration a distance L from the position of the rib attached to the top surface of the upper flat member 6, to the position of edges of the opening in the casing, which are welded to the upper flat member. In other words, in case the distance L is small relative to a height H, there results difficulty in the welding operation for the edges of the opening in the casing, from viewpoint of a space limitation. The test results show that the distance L of no less than 200 mm allows the satisfactory welding operation for the opening of the casing, without being hindered by the height H of the rib 9, and that the distance L of no more than 200 mm dictates the consideration of the height H of the rib 9, i.e., the relationship $H/L \leq 1.5$ should preferably be maintained. Meanwhile, referring to FIG. 3, for minimizing the deformation of the upper flat member 6, the position Z where the edge of the casing 1 is welded and the position Y where the upper cover 3 is connected should be determined, taking into consideration the magnitudes and directions of forces applied to the positions Y and Z through the cover 3 and casing 1, respectively, due to the hydraulic pressures. In detail, the positions Y and Z are determined in such a manner that the moment about the point X, which is the center of gravity of the cross-section of the members 6 and 9, of the speed ring by the forces applied to the positions Y and Z through the cover 3 and casing 1 becomes zero.

Figure 4:
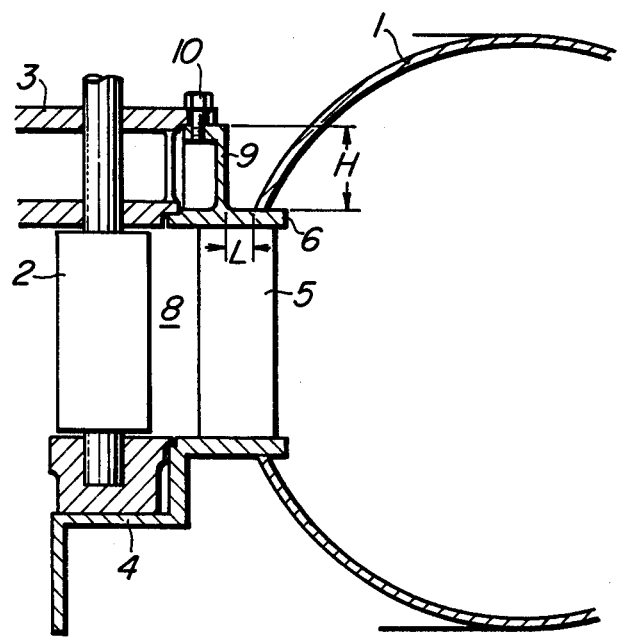
FIG. 4 is a partial cross-sectional view of the speed ring and part of the casing, showing another embodiment of the water intake portion of a hydraulic machine according to the present invention.

In case the attaching position of the casing 1 on the speed ring is determined with reference to the position of the center of gravity, it may happen that the relationship $H/L \leq 1.5$ can not be maintained. In such a case, as shown in FIG. 4, a flange is formed on the top face of the rib 9 in a manner to connect the rib 9 with the upper cover 3. This allows to some extent the adjustment of the distances between the center of gravity and the positions of the casing welded to the upper flat member, and between the center of gravity and the joint of the cover 3 to the upper flat member 6.

As is apparent from the foregoing description of the water intake portion of the invention, the attaching positions of the upper cover 3 and casing 1, relative to the upper flat member 6, may be adjusted. In addition, the non-destructive inspection may be conducted for welds in the speed ring in a plant so equipped. Thus, there may be achieved a speed ring which presents high reliability in strength, because a torsion moment acting on the upper flat member 6 due to a hydraulic pressure may be minimized. In addition, as has been described earlier, a torsion moment is not exerted on the flat member to a noticable extent, so that a special reinforcement is not required for weld joints of the edges of an opening in the casing. Yet furthermore, the non-destructive inspection may be conducted in the setting-up site of a hydraulic machine, and there may be achieved a water intake portion which is high in reliability in strength.

What is claimed is:

1. In a method for fabricating a water guide portion of a hydraulic machine on site, said portion including a casing and a speed ring having a flat annular member fixed relative to at least one opening of said casing, the improvement comprising the steps of welding a non-supportive annular rib member on one surface of said annular member at a position selected in such a manner that the moment of forces acting on the flat annular member about the center of gravity of the cross-section of the flat annular member and the rib is substantially zero and welding said casing to said speed ring with an edge of said opening of said casing being arranged between said rib member and outer periphery of said annular member.

2. A method according to claim 1, wherein the position of said edge between said rib member and said outer periphery is determined by the relationship $H/L \leq 1.5$, wherein H is the height of said rib member and L is the distance between said rib member and said position of said edge.

* * * * *